July 21, 1959
M. J. NAGY
2,895,367
SELF-BROACHING FASTENERS
Filed July 19, 1954
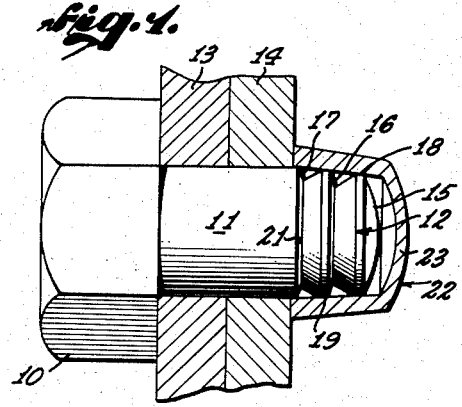
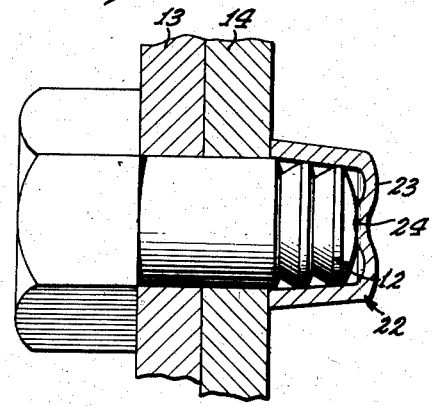
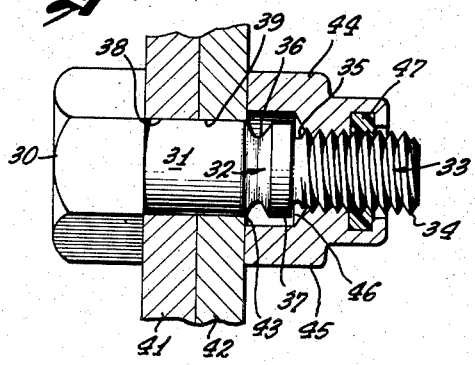
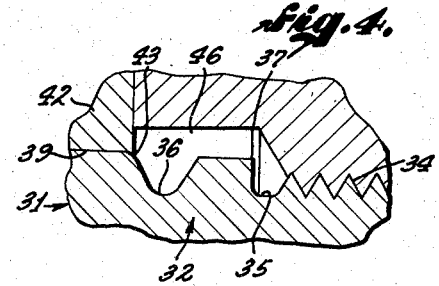
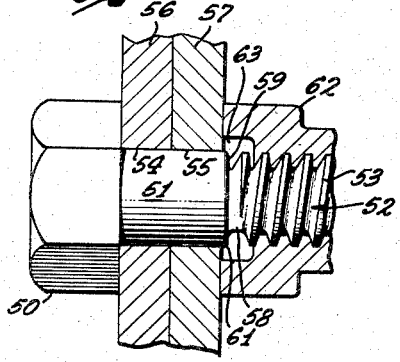
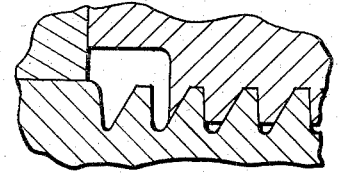
MICHAEL J. NAGY,
INVENTOR.
BY *George V. Smyth*
ATTORNEY.

United States Patent Office 2,895,367
Patented July 21, 1959

2,895,367

SELF-BROACHING FASTENERS

Michael J. Nagy, Inglewood, Calif., assignor, by mesne assignments, to Pastushin Aviation Corporation, Los Angeles, Calif., a corporation of California Application July 19, 1954, Serial No. 444,177

3 Claims. (Cl. 85—1)

This invention relates to fasteners such as bolts and more particularly to fasteners for securely holding at least a pair of members in fixed relationship to each other upon insertion of the fasteners into support holes in the members.

Fasteners such as bolts have long been used to secure a plurality of members together. The shank portions of such fasteners are inserted into registering openings in the members and are held against movement in one direction by the head of the fastener and in the opposite direction by many and greatly differing means. One difficulty with such fasteners has been that the shank portions of the fasteners oftentimes do not fit snugly into the openings in the member to be secured. This is due to many causes which are difficult, if not impossible, to correct or eliminate. For example, manufacturers of fasteners must, if the costs are not to be prohibitive, be permitted some range of tolerances for their fasteners. Some tolerances must also be allowed to the workman drilling or otherwise forming the openings into which the fasteners are to be mounted.

Whatever the cause, a secure jointure cannot be had if the shank of the fastener does not snugly fit within the opening of the parts to be secured. In some instances, the play between the shanks of the fasteners and the walls of the openings has permitted such movement of the secured parts as to result in ultimate damage to the material of the parts. A very common damage in such jointures is the enlargement of the pre-formed openings receiving the fastener and which eventually produces a failure of the structure secured. This is particularly true where the fastener is formed of a metal or metal alloy harder than the material of the parts to be secured.

It has long been determined that it is not economically feasible to maintain close tolerances in the shank and in the openings such that the shanks of the fasteners will always snugly fit into the openings. The difficulties encountered, however, are serious and various attempts have been made to alleviate these difficulties but none of them with complete success.

One serious attempt has been to provide the fastener with a cutting edge at a forwardly disposed position on the shank so that a broaching action is produced on the holes to enlarge their diameter to a particular value. In this way, it was thought a second shank portion having substantially the same diameter as that of the cutting edge on the first shank portion would be able to fit snugly in the broached openings.

One difficulty with the broaching type of fastener as previously proposed has been that the excess material removed from the walls of the support openings has accumulated ahead of the broaching surface on the shank and impeded the progress of the shank through the openings. This has resulted in large part from the fact that the shank has had, adjacent the broaching surface, a peripheral configuration which has prevented the excess material from collecting at any place between the shank and the walls of the support openings.

This application, as well as my co-pending application, Serial No. 437,489, filed June 17, 1954, and now abandoned, provides a headed fastener which eliminates the above difficulties. In addition to the usual shank portion adjacent the head, the fastener includes a second shank portion having a cutting edge at a forward position for producing a broaching action on the walls of the support openings. At a more rearward position, the second shank portion also has an edge with a diameter at least equal to, and preferably slightly greater than, the diameter of the forward cutting edge. The more rearward edge is preferably slightly larger than the forward edge and so shaped that a burnishing action is produced on the walls of the support openings after the broaching operation. This forward edge can be a broaching edge, however, so that progressive broaching actions can be produced by the spaced cutting edges to minimize the amount of material that has to be cut by each edge.

The second shank portion is shaped to provide at least one neck portion of reduced cross-sectional dimension between the two longitudinally spaced cutting edges. This neck portion serves to collect particles cut from the walls of the support opening during the insertion of the fastener into the openings. In this way, the particles cannot impede the movement of the first shank portion into the openings or foul the action of the broaching means of the fastener.

The fasteners of the present invention differ from the fasteners of my co-pending application above identified, by the means used to hold the same against withdrawal from the member to be secured. The means of present invention do not require a swaging or upsetting operation but circumscribe the second shank portion and coact therewith to apply a tension force to the fastener such as to hold the head thereof in tight engagement with the face of the one outer member. In all forms of the invention illustrated, the holding means includes means engaging and bearing against the member at the side of the assembly, opposite the side engaged by the head of the fastener.

An object of this invention is to provide a fastener of the above character for producing a broaching action on the walls of the support openings to provide a snug fit between the openings and a shank portion on the fastener.

A further object is to provide a fastener of the above character having a shank shaped to provide a broaching action at a forward position and a further action, either broaching, shaving or burnishing, at a rearward position and to collect material cut from the walls of the openings in at least one neck portion between the forward and rearward positions.

As the shank of the fastener very snugly engages the walls of the openings, once the fastener is moved into its ultimate position, the fastener of the present invention is particularly useful for sealing elements forming a tank member for holding liquids or the like. To augment the sealing effect of the snug fitting shank, the member used for retaining the fastener is formed with internal wall means defining, once the member is secured to the second shank portion, a chamber circumscribing the latter. The chamber is intended to be filled with a suitable caulking or sealing compound which will be compressibly held about the mouth of the opening and the shank portion projecting therefrom after the retainer member is secured in place.

It is, therefore, a further object of the present invention to provide chamber means within the retainer member for holding a sealing compound which is trapped against escape once the retainer member is secured to the projecting shank portion of the fastener.

Other features and advantages of the present invention will be apparent from the following detailed description, particularly when taken in connection with the accompanying drawing, in which:

Figure 1 is a view partly in section, showing one embodiment of the fastener before the retaining member is secured thereto;

Figure 2 is a similar view but showing the retainer member secured to the shank portion of the fastener;

Figure 3 is a view similar to Figure 2 but showing a modified form of the fastener;

Figure 4 is a fragmentary view in section of the embodiment shown in Figure 3;

Figure 5 is a sectional view showing a further modified embodiment of the present invention, and Figure 6 is a fragmentary view in section showing a portion of the embodiment shown in Figure 5.

The fastener of the present invention, and more particularly the embodiment shown in Figures 1 and 2 of the drawing, comprises a head 10, a first shank portion, generally designated 11, immediately adjacent the head 10 and a second shank portion, generally designated 12. The fastener is formed of a suitable steel alloy harder than the material of the members 13 and 14, here illustrated as being secured by the fastener. The members 13 and 14 are preformed with openings through which the shank portions of the fastener are to be forced in the step of securing the members 13 and 14 in facewise abutting relationship.

The leading end of the second shank portion 12 is tapered or rounded to provide a pilot surface 15 which coacts with the defining edges of the opening formed in the member 13 to guide and center the second shank portion relative to the opening at the initiation of the insertion step. Rearward from the pilot surface 15, the second shank portion 12 of the fastener is formed with two spaced circumferential grooves 16 and 17 which are preferably of the configuration shown. The first groove 16, together with the pilot surface 15, forms a first or leading broaching element 18 and the groove 17 coacts with the groove 16 to define a second broaching element 19.

The first broaching element 18 has a diameter slightly larger than the original diameter of the openings preformed in the members 13 and 14 and the second broaching element 19 is of still larger diameter. The first shank portion 11 is formed with a smoothly tapered leading edge 21 and the diameter of the first shank portion 11 is slightly larger in diameter than the second broaching element 19. Thus, the edge 21 serves as a burnishing element which follows-up the actions of the two broaching elements 18 and 19.

It is contemplated that the fastener will be pushed through the openings in the members 13 and 14 by a suitable tool (not shown) but formed with a recess for receiving and engaging the head 10. This head has been here illustrated as hexagonal in cross-section although it is to be understood that the head may take any size or shape desired. As the shank portions of the fastener move progressively through the openings in the members 13 and 14, the openings are progressively enlarged by the action of the broaching and burnishing elements.

Since the enlargement of the openings in the members 13 and 14 proceeds step by step, each of these successive enlarging actions is not sufficiently drastic to materially impede the progress of the fastener towards its ultimate or final position. The shavings and particles separated from the walls of the openings during the enlarging operations are received by the circumferential grooves 16 and 17 to thus avoid impedance of the axial progress of the fastener and to prevent the fouling of the cutting operations preformed by the broaching and burnishing elements.

When the fastener is forced to the ultimate or final installed position shown in Figure 1, with the head 10 in pressure contact against the member 13, a cup-shaped retainer member 22 is placed about the second shank portion 12 of the fastener. This retainer member has an axial length slightly greater than the length of the fastener projecting beyond the member 14. In other words, the retainer member has a length slightly greater than the length of the second shank portion of the fastener.

The retainer member 22 is frusto-conical in shape and is formed with a transverse end wall 23 which is concavo-convex in shape. This end wall 23 has a thickness less than the thickness of the conical wall portion of the retainer member, and is therefore somewhat flexible. After the retainer member is placed over the projecting end of the fastener a conventional spot-welding tool is brought into engagement with the curved or domed end wall 23 and this wall is secured to the pilot surface 15 by a spot-weld indicated at 24.

The heat and pressure produced during the spot-welding operation causes the end wall 23 to dish inwardly as clearly shown in Figure 2 of the drawing. Once the spot-weld has been formed, and the welding tool removed from the retainer member, the wall 23 will tend to return toward its original position. The reaction forces thus created acts to hold the base of the retainer member tightly engaged with the outer face of the member 14 and to further create tension forces in the fastener body such as to hold the undersurface of the head 10 snugly engaged with the member 13.

The dimension or length of the retainer member relative to the length of the second shank portion 12 is somewhat critical for the retainer member must be at least of a length greater than the length of the second shank portion but yet cannot be so much greater that the domed wall 23 will not dish inwardly a distance sufficient to permit the spot-welding operation. On the other hand, because of the flexibility of the wall 23, some tolerance is permitted and variations in length of the second shank portion can be tolerated with a retainer member of fixed length. It is preferred, however, to maintain the diameter of the base portion of the retainer member just slightly larger than the diameter of the first shank portion of the fastener.

The fastener of the embodiment shown in Figures 1 and 2 is particularly adapted for use in tanks or containers for holding liquids. This is so for the combined broaching and burnishing operations performed as the fasteners is forced through the preformed openings of the members to be secured insured that the first shank portion will very snugly fit the walls of these openings once the fastener reaches its final position. Furthermore, the retainer member may be partially filled with some suitable caulking or sealing component just before it is inserted over the projecting end fastener. As the reaction forces above explained very tightly hold the base portion of the retainer member against the outer element of the assemblage secured, the combined sealing action of this engagement, together with the trapped composition, insures a liquid-proof jointure which is not apt to fail in use.

The embodiment of the fastener shown in Figures 3 and 4 of the drawing also include a head 30, a first shank portion 31, a second shank portion, generally designated 32, and a third shank portion, generally designated 33, which is formed with suitable threads 34. Here again, the fastener is formed of a suitable steel alloy harder than the material of the members to be secured by the fastener. The second shank portion 32 is formed with a pair of longitudinally spaced but circumferentially expanding grooves 35 and 36. The rearward wall of the groove 35 is arranged, as best seen in Figure 4, substantially normal to the longitudinal axis of the shank portion, while the forward wall of this groove actually forms a part of the threads 34.

The grooves 35 and 36 coact to form a broaching element 37 having an outer diameter slightly greater than that of the openings 38 and 39 preformed in the abutting members 41 and 42 which are to be secured together by the fastener. The broaching element 37 extends axially along the shank for a moderate distance and terminates, as above explained, in the circumferentially extending groove 36.

The portion of the fastener shank defined by the surface 43 contiguous to the groove 36, comprises a burnishing element of a diameter slightly greater than the diameter of the broaching element 37. The diameter of the burnishing element is equal to that of the shank portion 31 to insure that the shank portion 31 will snugly fit the walls of the openings 38 and 39 when the fastener is mounted in its ultimate position.

Here again the fastener is forced through the openings 38 and 39 by a suitable tool (not shown) but one having a recess formed to take the head 30 of the fastened. As the broaching element 37 moves through the opening it produces a cutting action on the walls of the openings since its outer diameter, as above explained, is slightly larger than the diameters of the openings. This cutting action causes the openings 38 and 39 to become substantially concentric if they were slightly unbalanced originally relative to each other. The material removed from the walls of the openings during the broaching operation, as in the earlier described embodiment, is collected in the grooves 36 and 35 so as not to impede the progress through the openings or foul the cutting action of the broaching element 37.

After the broaching element 37 has moved through the aligned openings 38 and 39, these openings are again enlarged by the burnishing element as the latter moves into engagement with and along the walls of the openings. The burnishing element not only slightly enlarges the openings, but also smooths the walls of the same so that the shank portion 31 will very tightly fit within the openings following the burnishing action.

At the completion of the inserting action, the head 30 will be engaged with the member 41 and the threaded portion of the shank will extend outwardly from the opposite member 42. To hold the fastener in this position, a nut member 44 having a threaded bore is now threadedly mounted to the extending shank portion 43. The nut member 44 has a skirted base portion 45 having an internal chamber 46 for receiving the broaching element 37 to permit the nut 44 to be tightened on the threaded shank portion 33 without interference from the broaching element 37.

To retain the nut member 44 against accidental rotation, a conventional fiber insert 47 may be provided for producing a compressive action on the threads 34 and thus frictionally hold the shank and nut against accidental relative rotation.

Here again the fastener of this embodiment is particularly adapted for use in tank structures intended to hold a liquid. As the shank portion 31 very snugly engages the walls of the openings 38 and 39 after the shank portion 32 has passed therethrough, a relatively efficient metal-to-metal seal is effected between the fastener shank and the walls of the openings 38 and 39. Furthermore, a suitable sealing compound can be placed within the chamber 46 prior to the mounting of the nut to the threaded shank portion 43 to augment the seal of the openings in which the fastener is mounted.

As the nut member 44 is threaded onto the shank portion 33 to bring the base or skirt portion 45 into engagement with the member 42, the reaction forces produced induce tension loads into the rivet shank to maintain the head 30 tightly in engagement with the member 41.

The embodiment of the fastener of the present invention illustrated in Figures 5 and 6 of the drawing comprises a head 50, here shown as hexagonal in form, a first shank portion 51, and a second shank portion 52. The shank portion 52 is formed with buttress threads 53 forming a helical surface extending longitudinally of the shank portion 52 and presenting a surface arranged substantially normal at any station therealong relative to the longitudinal axis of the shank of the fastener.

The buttress threads 53 are formed of such a size relative to the diameter of the shank portion 52 as to produce a broaching action on the walls of the openings 54 and 55 formed in the members 56 and 57 to be secured in facewise engagement by the fastener.

The threaded shank portion 52 terminates in a circumferentially extended groove 58, the one wall 59 of which coacts to form with the surface of the shank portion 51 a burnishing element 61. Here again the diameter of the burnishing element 61 is slightly larger than the diameter of the broaching element formed by the buttress threads 53.

In the insertion of the fastener of this embodiment of the invention, a suitable tool having a recess nesting the head 50 may be rotatably driven in a direction opposite to the pitch of the buttress threads 53 whereby the fastener is rotated as it is urged through the openings 54 and 55. As in the earlier described forms of the present invention, the broaching element first shaves or removes material from the walls of the opening to first render the walls concentric and secondly to enlarge the diameter of the openings. After the broaching element has performed this operation, the walls of the openings are smoothed and slightly enlarged by the passage of the burnishing element 61 therethrough.

Once the fastener has been fully inserted, with the head thereof engaging the sheet member 56, a nut or like retainer 62 formed internally with matching buttress threads is mounted to the threaded shank portion 52. The nut member as it is threaded onto the shank portion 52 is brought into engagement with the member 57 to apply as will now be understood a tension force to the shank of the fastener to hold the head 50 tightly in engagement with the assemblage formed by the members 56 and 57.

The nut 52 is also formed with internal wall means defining a chamber 63 for receiving a suitable sealing compound in uses when a highly efficient seal is required.

It will now be seen that in all embodiments of the invention herein shown, the shanks of the fastener are formed with at least one broaching element which enlarges the openings as the element is moved through the openings. Furthermore, the shank of each embodiment illustrated, is provided with a burnishing element which will smooth and further enlarge the openings receiving the shank to a diameter substantially equal to that portion of the shank which is arranged axially next to the head of the fastener. In all embodiments, the means used for retaining the fastener in the fully-inserted position includes internal wall means defining a chamber for receiving a sealing compound for further sealing the openings in which the shank element snugly fits. Also, each of the retaining members used induce into the shank tension loads such as to hold the head of the fastener tightly in engagement with the outermost member of the assemblage comprising the members secured by the fastener.

Although the now preferred embodiments of the present invention have been shown and described herein, it is to be understood that the invention is not to be limited thereto for it is susceptible to changes in form and detail.

I claim:

1. A fastener made of relatively hard high strength metal for use in attaching together a plurality of members having aligned preformed openings, said fastener having: a head for abutment against the outer side of one of said members; a shank comprising a first shank portion integral with and adjacent to said head for ultimate positioning in said openings and a second shank portion integral with and axially adjacent said first shank portion, said second shank portion being formed with a plurality of axially spaced circumferential elements to enlarge said preformed openings when the fastener is forced into the preformed openings, said first shank portion being at least as large in cross-section as the rearmost opening-enlarging element for tight fit in the enlarged openings, said second shank portion being circumferentially grooved between the successive opening-enlarging elements to receive particles removed from said members by the enlarging action of said elements; and a retainer member secured to the second shank portion and engageable by direct pressure contact with the outer side of the members opposite to the member engaged by said head for holding said fastener against withdrawal from said openings, said retainer member having internal wall means defining a chamber circumscribing said second shank portion for receiving and holding a sealing compound, said opening-enlarging elements being shaped for rotary cutting action on the walls of said preformed openings, and the head of said fastener having a shape for engagement by the walls of a complementary recess of a rotary driving tool for installation of the fastener.

2. A fastener made of relatively hard high strength metal for use in attaching together a plurality of members having aligned preformed openings, said fastener having: a head for abutment against the outer side of one of said members; a shank comprising a first shank portion integral with and adjacent to said head for ultimate positioning in said openings and a second shank portion integral with and axially adjacent said first shank portion, said second shank portion being formed with a plurality of axially spaced circumferential elements to enlarge said preformed openings when the fastener is forced into the preformed openings, said first shank portion being at least as large in cross-section as the rearmost opening-enlarging element for tight fit in the enlarged openings, said second shank portion being circumferentially grooved between the successive opening-enlarging elements to receive particles removed from said members by the enlarging action of said elements; and a retainer member secured to the second shank portion and engageable by direct pressure contact with the outer side of the members opposite to the member engaged by said head for holding said fastener against withdrawal from said openings, said retainer member having internal wall means defining a chamber circumscribing said second shank portion for receiving and holding a sealing compound, said opening-enlarging elements being shaped for rotary cutting action on the walls of said preformed openings; and said retainer member is secured to said second shank portion by means coacting with said elements.

3. A fastener made of relatively hard high strength metal for use in attaching together a plurality of structural members having aligned preformed openings, said fastener having: a head for abutment against the outer side of one of said members; a shank comprising a first shank portion integral with and adjacent to said head for ultimate positioning in said openings and a second shank portion integral with and axially adjacent said first shank portion, said second shank portion being formed with a plurality of axially spaced circumferential elements to enlarge said preformed openings when the fastener is forced through the preformed openings to dispose said second shank portion outwardly of said member at the side opposite the side engaged by said head, said elements comprising a leading broaching element of a cross-sectional dimension larger than the preformed openings by a relatively small difference in dimension for removal of numerous particles from the walls of the openings and at least one following element of still larger cross-section for further removal of numerous particles from the walls of the openings, said first shank portion being at least as large in cross-section as the rearmost opening-enlarging element for tight fit in the enlarged openings, said second shank portion being circumferentially grooved between the successive opening-enlarging elements to receive particles removed from said members by the enlarging action of said elements; a retainer member adapted to be telescopically mounted to the outwardly projecting second shank portion; and means for securing said retainer member to said second shank portion with said retainer member compressively engaged with the contiguous structural member in direct contact therewith, said retainer member having internal wall means defining a chamber for holding a compound for sealing the openings with which said first shank portion is fitted, said retainer member comprising a cup-shaped element having a concavo-convex end closing wall to be secured by a spotweld to said second shank portion.

References Cited in the file of this patent

UNITED STATES PATENTS

| | | |
|---|---|---|
| 551,137 | Waters | Feb. 25, 1896 |
| 1,441,502 | Hook | Jan. 9, 1923 |
| 1,490,069 | Gammon | Apr. 8, 1924 |
| 2,001,290 | Thomson | May 14, 1935 |
| 2,295,900 | Hoppenstand | Sept. 15, 1942 |
| 2,392,481 | Kaplan | Jan. 8, 1946 |
| 2,396,005 | Gross | Mar. 5, 1946 |
| 2,450,694 | Sauer | Oct. 5, 1948 |
| 2,510,076 | Cockrell | June 6, 1950 |
| 2,531,048 | Huck | Nov. 21, 1950 |
| 2,643,443 | La Pointe | June 30, 1953 |

FOREIGN PATENTS

| | | |
|---|---|---|
| 658,818 | Great Britain | 1951 |
| 895,710 | Germany | Nov. 5, 1953 |